United States Patent Office 3,427,281
Patented Feb. 11, 1969

3,427,281
N,N'-DI(1,3,3-TRIMETHYLBUTYL)-p-PHENYL-
ENEDIAMINE AS RUBBER STABILIZER
Evan J. Young and Gene R. Wilder, St. Albans, W. Va., assignors to Monsanto Company, St. Louis, Mo., a corporation of Delaware
No Drawing. Filed Dec. 9, 1965, Ser. No. 512,768
U.S. Cl. 260—45.9                     3 Claims
Int. Cl. A61l 13/00; C08d 5/00; C07c 87/62

ABSTRACT OF THE DISCLOSURE

The normally solid compound, N,N'-di(1,3,3-trimethylbutyl)-p-phenylenediamine is described which is useful as a rubber antiozonant and for inhibiting germination of the pathogen *Venturia inaequalis*.

---

This invention relates to N,N'-di(1,3,3-trimethylbutyl)-p-phenylenediamine, a new compound having unique physical and chemical properties. The new compound is valuable for inhibiting degradation of oxidizable materials, especially natural and synthetic rubbers.

Certain N,N'-dialkyl-p-phenylenediamines are used to protect rubber from ozone and oxygen. These dialkyl-p-phenylenediamines are particularly valuable for protecting rubber against ozone. Suitable products are described in U.S. Patent 2,867,604 to R. A. Rosenwald et al. granted Jan. 6, 1959. According to the patent, higher secondary alkyl is preferred; and it is further preferred that the longer chain of the aliphatic substituent be substantially straight chain and, at the most, only of mild branching. Materials widely used in commerce are N,N'-bis(1-ethyl-3-methylpentyl)-p-phenylenediamine, N,N'-bis(1-methylheptyl)-p-phenylenediamine, and N,N'-bis(1,3-dimethylpentyl)-p-phenylenediamine, all of which are liquids. However, for some purposes solid products are required. Some manufacturers are not equipped to handle liquid products.

It has now been discovered that N,N'-di(1,3,3-trimethylbutyl)-p-phenylenediamine is a high-melting solid which possesses remarkable antiozonant activity, being unexpectedly superior to its less-branched isomers. The compound is also useful to inhibit the germination of the common plant fungal pathogen *Venturia inaequalis*, the causative organism of apple scab.

The new compound was prepared by charging a one-liter autoclave with 41 grams (0.3 molecular proportions) of p-nitroaniline, 175 grams (1.58 molecular proportions) of methyl neopentyl ketone, 5 grams of 1% platinum on carbon, and 1.0 ml. of acetic acid. The p-nitroaniline was reduced with hydrogen at 100° C. and at 100 pounds per square inch. The temperature was then raised to 130° C. and the pressure to 300 pounds per square inch until reductive alkylation was complete as evidenced by gas liquid chromatography. The reaction product was filtered and the volatile constituents removed from the filtrate by distillation to obtain as a residue 72 grams of N,N'-di(1,3,3-trimethylbutyl)-p-phenylenediamine. It melted at 97°–98° C. after recrystallizing from heptane.

Rubber ozone resistance data for the compound of this invention are reported in the following table. The method used for measuring the ozone damage to vulcanized rubber is described by Decker and Wise, "The Stress Relaxation Method for Measuring Ozone Cracking," Rubber World, April 1962, p. 66. The equipment used in these tests is comprised of a Blue M Oven used as an ozone cabinet. This is a product of the Blue M Electric Company of Blue Island, Ill. The cabinet is modified with Hanovia ozone generating equipment. Six quartz lamps are installed in the air chamber beneath the oven floor. The ozone concentration in the cabinet is controlled with the lamps. The ozone concentration in the chamber can be controlled within ±5 from 10 to 200 parts per hundred million parts of air. The cabinet is equipped with a rack for static testing and one for dynamic testing. The static rack handles 12 stocks at strains of 5, 10, 20, 30, and 40%. The dynamic tester is a reciprocal mechanism which imparts a 25% strain to the rubber test pieces. The top plate of the dynamic tester moves up and down, and the bottom plate is stationary. The tester is driven at a rate of 90 cycles per minute by a gear motor mounted on the outside of the cabinet. The test pieces of rubber are two-inch long T–50 (ASTM D599–55) specimens died from standard stress-strain test sheets (ASTM D15–57T). They are mounted by placing their ends in the radial slots milled into the edges of the circular plates of the racks. The tab ends fit into the circumferential grooves machined into the outer surfaces of the plates.

The stress-relaxation method is based on the principle that the effective cross-sectional area of a small test piece of rubber is reduced by ozone cracking. The extent of cracking in a test piece is determined by measuring the forces required to extend the test piece 100% before and after exposure to ozone. As the strip begins to crack, the number of stress-supporting rubber chains decreases, and the force required to extend the strip 100% is reduced. The ratio of this force to the original force is calculated at approximately sixteen-hour intervals of exposure to ozone. The graph of force vs. time is essentially a straight line, and the time required for attaining 90%, 80%, and 70% of the original force is readily determined from the graph. The ability of the rubber to resist ozone attack is obtained by comparison of these numbers. These ratios are the percent of original modulus of the rubber test piece and are listed as percent retention in the table, infra. The ozone concentration for the tests is 25 parts ozone per hundred million parts of air. Longer times in the data demonstrate better ozone resistance of the rubber stock. The intermittent test comprises two-hour cycles during which the specimens are exposed dynamically 15% of the time and during the remaining time of the cycle are exposed statically at 25% strain.

The stocks of the table are vulcanized rubber stocks comprised of a B–1 SBR base stock containing 100 parts styrene-butadiene rubber 1500, 50 parts Philblack O which is high abrasion furnace carbon black, 4 parts zinc oxide, 2 parts stearic acid, and 10 parts Necton 60 which is a hydrocarbon softener. Added to the base stock are 1.0 part Santocure NS which is the accelerator N-tert-butyl-2-benzothiazolesulfenamide, 1.75 parts sulfur, and 2 parts of the listed antiozonant.

The stocks of Table I contain the following antiozonants:

Stocks
1 ____ This stock is a blank containing no antidegradant
2 ____ N,N'-bis(1,3-dimethylpentyl)-p-phenylenediamine Stocks
3 ---- N,N'-bis(1,3,3-trimethylbutyl)-p-phenylenediamine

TABLE I

|  | Stocks | | |
| --- | --- | --- | --- |
|  | 1 | 2 | 3 |
|  | Hours | | |
| Unaged dynamic ozone resistance: | | | |
| 90% retention | 3 | 36 | 45 |
| 80% retention | 8 | 55 | 73 |
| 70% retention | 13 | 72 | 98 |
| Unaged intermittent ozone resistance: | | | |
| 90% retention | 2 | 40 | 51 |
| 80% retention | 6 | 67 | 91 |
| 70% retention | 10 | 97 | 128 |
| Aged dynamic ozone resistance: | | | |
| 90% retention | 4 | 19 | 16 |
| 80% retention | 9 | 28 | 33 |
| 70% retention | 16 | 42 | 53 |
| Aged static ozone resistance: | | | |
| 90% retention | 2 | 7 | 11 |
| 80% retention | 6 | 14 | 22 |
| 70% retention | 10 | 24 | 36 |
| Aged intermittent ozone resistance: | | | |
| 90% retention | 2 | 10 | 11 |
| 80% retention | 6 | 20 | 23 |
| 70% retention | 11 | 32 | 36 |

The foregoing table illustrates the significance of the compound of this invention when used as an antiozonant in rubber. It was observed that the stock containing the new antiozonant was less susceptible to prevulcanization than the Stock 2 containing the commercial control.

In general, any of the unsaturated rubbers prepared from dienes are susceptible to degradation by ozone and may be protected by the compound of this invention, either by incorporating it into the diene rubber or applying it to the surface thereof. Beneficial effects are obtained from amounts within the range of 0.1% to 10% by weight of the rubber. Suitable rubbers comprise natural rubber, synthetic cis-1,4-polyisoprene, ethylene-propylene terpolymer, and the various polymers and copolymers of butadiene as for example, cis-1,4-polybutadiene, oil extended styrene-butadiene, Butyl rubber, and copolymers of butadiene with acrylonitrile or methyl methacrylate.

Fungicidal activity was demonstrated by spore germination tests on glass slides. In this procedure the experimental compound was formulated as a 10 p.p.m. aqueous solution. One drop of this solution was placed in a well of a concavity glass slide and two drops of a conidial suspension of *Venturia inaequalis* (adjusted to 625,000 per mil.) were added. The slides were then placed into a petri plate, water added to the plate to provide humidity, and the plate covered with a lid. After 24 hours the cover was removed, the slides examined, and the observations recorded. For convenience in recording the data, the following rating key was employed:

1—no germination, complete control
2—short germ tubes, definite chemical activity
[1] 5—no inhibition of germination

[1] At least four untreated slides were set up for each test in order to compare the appearance of the chemically treated organism with that of the untreated system.

Results of the observations are recorded in Table II.

Table II

| Active component: | Rating |
| --- | --- |
| N,N'-bis(1,3,3 - trimethylbutyl) - p - phenylenediamine | 1 |
| N,N'-bis(1,3 - dimethylpentyl) - p - phenylenediamine | 5 |

It is intended to cover all changes and modifications of the examples of the invention herein chosen for purposes of disclosure which do not constitute departures from the spirit and scope of the invention.

What is claimed is:

1. Diene rubber containing a small amount sufficient to inhibit ozone degradation of N,N'-di(1,3,3-trimethylbutyl)-p-phenylenediamine.

2. The product of claim 1 where the rubber is vulcanized.

3. The product of claim 1 where the rubber is styrene-butadiene copolymer rubber.

References Cited

UNITED STATES PATENTS

| 2,867,604 | 6/1955 | Rosenwald et al. | 260—45.9 |
| 3,126,412 | 3/1964 | Stahly | 260—45.9 |
| 3,032,520 | 5/1962 | Shaw | 260—45.9 |
| 2,067,686 | 1/1957 | Semon | 260—45.9 |

DONALD E. CZAJA, *Primary Examiner.*

HOSEA E. TAYLOR, JR., *Assistant Examiner.*

U.S. Cl. X.R.

260—577, 809